US006600729B1

United States Patent
Suzuki (10) Patent No.: US 6,600,729 B1
(45) Date of Patent: Jul. 29, 2003

(54) DS-CDMA MULTI-USER INTERFERENCE CANCELLER AND DS-CDMA COMMUNICATION SYSTEM

(75) Inventor: Hideto Suzuki, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/286,388

(22) Filed: Apr. 5, 1999

(30) Foreign Application Priority Data

Apr. 7, 1998 (JP) ............................................ 10-095076

(51) Int. Cl.⁷ ........................... H04B 7/216; H04J 13/04
(52) U.S. Cl. ...................... 370/335; 370/342; 375/148; 375/150; 375/346; 455/63
(58) Field of Search ................................. 370/201, 328, 370/329, 335, 342, 441, 479; 375/130, 140, 141, 142, 144, 147, 148, 150, 343, 346, 349; 455/422, 450, 500, 501, 509, 517, 63

(56) References Cited

U.S. PATENT DOCUMENTS

| 5,719,852 A | | 2/1998 | Schilling et al. | ............ 370/201 |
| 5,719,899 A | * | 2/1998 | Thielecke et al. | .......... 375/206 |
| 5,740,208 A | * | 4/1998 | Hulbert et al. | .............. 375/346 |
| 5,790,588 A | * | 8/1998 | Fukawa et al. | ............. 375/200 |
| 6,259,688 B1 | * | 7/2001 | Schilling et al. | ............ 370/342 |

FOREIGN PATENT DOCUMENTS

| EP | 0823796 | 2/1998 |
| EP | 0876002 | 11/1998 |
| EP | 0893888 | 1/1999 |
| GB | 2280088 | 1/1995 |
| JP | 7-131382 | 5/1995 |
| JP | 7-303092 | 11/1995 |
| JP | 9-270736 | 10/1997 |
| JP | 9-270766 | 10/1997 |
| JP | 10-28083 | 1/1998 |
| JP | 10-51353 | 2/1998 |
| WO | 97/33401 | 9/1997 |

OTHER PUBLICATIONS

UK Search Report issued Mar. 7, 2000 in a related application.
UK Search Report issued Sep. 8, 1999 in a related application.

* cited by examiner

Primary Examiner—Alpus H. Hsu
(74) Attorney, Agent, or Firm—Dickstein, Shapiro, Morin & Oshinsky, LLP.

(57) ABSTRACT

A DS-CDMA (Direct Sequence—Code Division Multiple Access) multi-user interference canceller is provided with a notifying unit for notifying symbol information, a delay of each path and transmission estimation value information of each path to other users, a correlation value calculator for calculating cross correlation values with spread code sequences of the other users in each user in advance, an interference calculator for calculating interference components of the other users on the basis of the information notified by the other users and the cross correlation values calculated in advance, and a subtracter for subtracting the interference components from the signal component of the present user, whereby the interference components are generated and cancelled at a symbol rate after a reception signal is subjected to despread.

20 Claims, 5 Drawing Sheets

DS-CDMA MULTI-USER INTERFERENCE CANCELLER AND DS-CDMA COMMUNICATION SYSTEM

BACKGROUND OF THE INVENTION

1. Field of the Invention

The present invention relates to a DS-CDMA multi-user interference canceller and a DS-CDMA communication system in a DS-CDMA (Direct Sequence—Code Division Multiple Access) communication system.

2. Description of the Related Art

Recently, the demand for portable mobile devices has been remarkably increased, and a DS-CDMA communication system or an FH (Frequency Hopping)-CDMA communication system are expected as a system for satisfying this demand. Further, it is being promoted to use base stations and a plurality of portable mobile equipment serving as mobile stations which use the above system.

According to the DS-CDMA communication system, voice signals and signal data is modulated by the DS (Direct Sequence)-based SS (Spread Spectrum) system. This system has various advantages of multi-user performance, high resistance to interference, high secrecy performance, etc., and high-quality telephone communications and data communications can be satisfied by the base stations and the plural mobile devices. However, when a number of users communicate with a base station in the same frequency band, the communication of a user may be disturbed due to interference of another user's communication. As compared with a frequency modulation system or a time-division multiplexing system, the DS-CDMA communication system has higher resistance to interference, however, restriction is imposed on the number of users which can communicate in the same frequency band.

In view of the foregoing problem of the DS-CDMA communication system, a multi-user serial interference canceller has been proposed, and also a method of reducing the interference in regionally-sectioned area cells and increasing the capacity for subscribers or enhancing the communication quality (QOS: Quality Of Service) has been proposed for the multi-user serial interference canceller. According to this method, before the signal of a user k ($1 \leq k \leq K$: K represents the number of all users in a cell) is decoded, interference replica components of users other than the user k which have been decoded until that time are generated and subtracted from the signal of the user k to decode the signal of the user k. This processing is carried out at I times (I represents the stage number of multi-stages), thereby reducing interference effects of the other users. The interference replica components generated with the other reception signals are delayed by the processing time corresponding to the number of the other users, and the interference components of the other users are subtracted from the reception signal of the user k concerned. As the number of the other users increases, the delay time is increased more and more, resulting in occurrence of such a problem that the capacity of a memory for holding the interference replica components which have been detected until the delay time is increased and the processing time is lengthened because the processing must wait during the delay time.

In order to resolve this problem, a multi-user serial interference canceller has been proposed. The principle of the multi-user serial interference canceller is described in "SEQUENTIAL CHANNEL ESTIMATION TYPE SERIAL CANCELLER USING PILOT SYMBOL IN DS-CDMA" of the technical reports of ELECTRONIC INFORMATION COMMUNICATION ASSOCIATE (RCS95-50), and an example of a fabricating method thereof is disclosed in "DS-CDMA MULTI-USER SERIAL INTERFERENCE CANCELLER" of Japanese Laid-open Patent Application No. Hei-09-270736.

Figure 4:
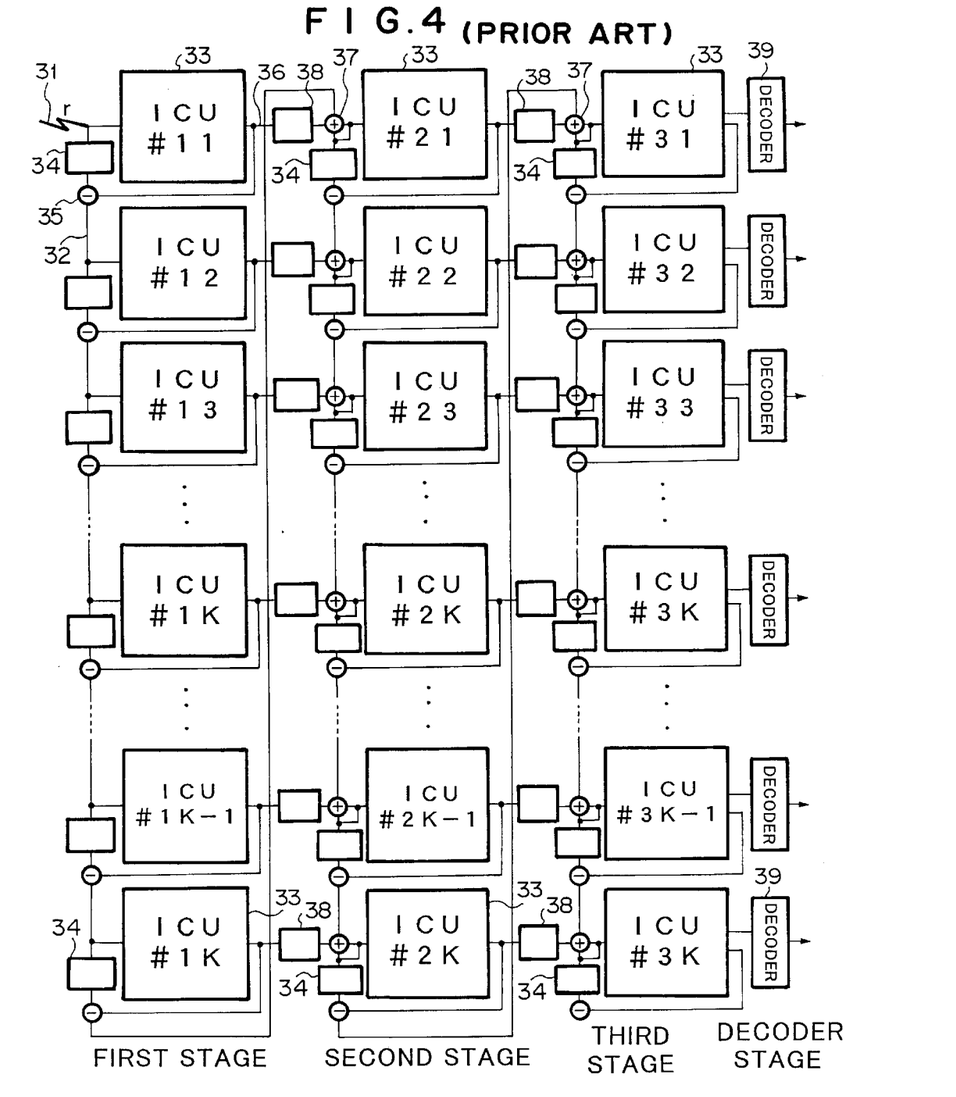
FIG. 4 is a block diagram showing the construction of a conventional type multi-user interference canceller.

FIG. 4 shows the method disclosed in Japanese Laid-open Patent Application No. Hei-09-270736. In FIG. 4, reference numeral 31 represents a reception signal, reference numeral 32 represents a interference-cancelled reception signal transmission line for transferring an interference-cancelled reception signal to an adjacent stage, reference numeral 33 represents an interference canceller unit ICU, reference numeral 34 represents a delay memory, reference numeral 35 represents a subtracter for subtracting interference replica components from the reception signal, reference numeral 36 represents an interference replica signal transferring line for transferring the interference replica signal of each user to its own user (present user) of a succeeding stage, reference numeral 37 represents an adder for adding a (interference) replica signal of the present user of a previous stage again (because the signal components of all the users of the first stage are subtracted), reference numeral 38 represents a delay (memory) for holding the (interference) replica signal of the present user of the previous stage, and reference numeral 39 represents a decoder for performing the final decoding.

Next, the operation of the multi-user serial interference canceller shown in FIG. 4 will be described.

A reception signal r31 is first input to ICU#11 (Interference Cancellation Unit) 33 of a first user in a first stage, and an interference replica signal S11 on the line 36 thereof is generated in ICU#11. Subsequently, in a subtracter 35, the interference replica signal S11 generated from the reception signal r31 is subtracted from the signal r31 which is delayed by the delay 34 for delaying the signal by the processing time in ICU#11, and the subtraction result is input to ICU#12 of a second user in the first stage. A signal [r31−S11] is input to ICU#12, and an interference replica signal S12 on the line 36 is output. Subsequently, the signal of a k-th user in an i-th stage which is represented by the following equation is generally transmitted to an adder 37 which is connected to ICU#k of the k-th user in the i-th stage:

$$y_{k,1}(m) = \int_{mT+\tau_{k,1}}^{(m+1)T+\tau_{k,1}} Ck(t-\tau_{k,1})C_k^*(t-\tau_{k,1}) \quad (1)$$

As is apparent from the equation (1), the equation (1) contains the reception signal r31 at all times, and thus it is unnecessary to transfer the reception signal by another system and holds the reception signal r31. Further, the signal in ICU#ik is a residual signal obtained by subtracting the components of all the users from the reception signal r31. Therefore, the signal $S_{(i−1)k}$, that is, the interference replica signal of the present user obtained at the previous stage is added again and then input to ICU before the processing for the k-th user in the i-th stage is carried out. AR of these signals are chip rate signals.

Figure 5:
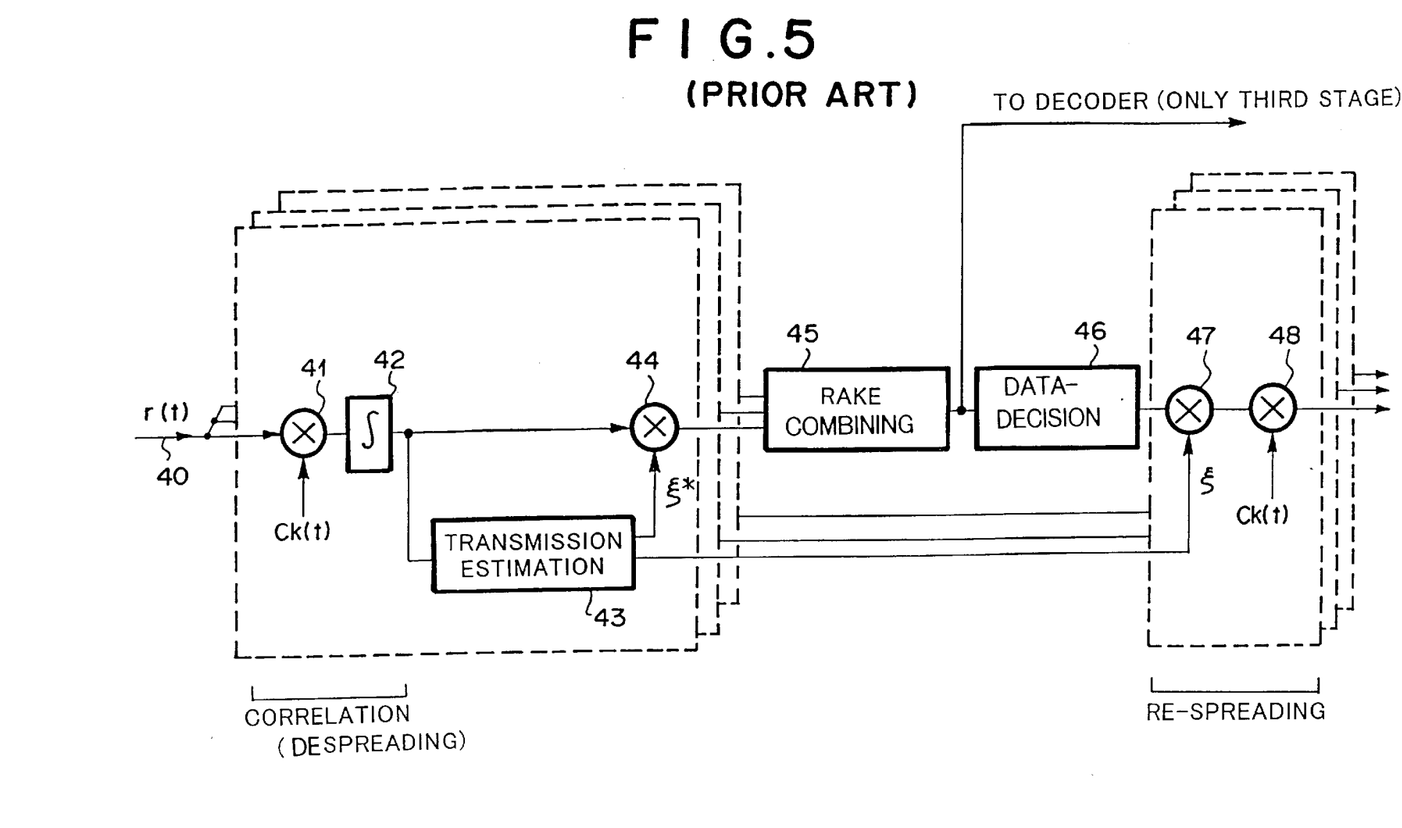
FIG. 5 is a block diagram showing the construction of ICU of the conventional multi-user interference canceller.

FIG. 5 shows the internal construction of ICU#ik based on the conventional system.

A reception signal r(t) input is despreaded by a spread code Ck(t) of the present path of the present user, and then integrated in an integrator 42 to examine a correlation therebetween. A transmission path fading vector $\xi$ is calculated from the integrated signal in a transmission estimator 43, and then the inverse $\xi'$ of the transmission path fading vector is multiplied by the integrated signal in a multiplier 54 to perform phase correction. The signal which is subjected to the phase correction every path is subjected to RAKE combining in a RAKE combiner 45. The signal output from the RAKE combiner 45 is output to a decoder and also is used to decode an original symbol sequence in a data-decision unit 46. Thereafter, the original symbol sequence is multiplied by the transmission path fading vector ξ every path in a multiplier 47 to be returned to an original transmission characteristic. The original transmission characteristic (Ck(t)) is multiplied/spread in a multiplier 48 to reproduce the interference replica signal of the chip rate, and then the interference replica signal is transferred to a succeeding user or a succeeding stage.

As shown in FIG. 4, in the final stage, the interference-cancelled signal is input to a decoder 39, and the final decoding result is output.

Japanese Laid-open Patent Application No. Hei-9-270766 discloses a transmission system for interference replica signals of DS-CDMA multi-user serial interference canceller as in the case of the above publication. According to this publication, the interference replica signal of each user is transmitted through a common bus line to be publicly inform to all the other users than the present user, and thus the signal having a transmission speed of (K×N) times of the transmission speed (=n-sampling times of spreading rate) of the interference replica signal of one user would flow on the common bus line if no modification is made. For example, if the transmission speed of the interference replica signal is equal to 120 Mbps, the number of users is equal to 16 and the number of stages is equal to 3, the transmission speed needed for the common bus line is equal to 5.76 Gbps, and this means that it is difficult to implement a circuit which satisfies this condition. Accordingly, this publication discloses a technique in which the signal is transmitted between adjacent users through a directly-connected parallel bus line or the like without using a common bus line, the processing is successively performed, the sum of the processing results is transferred, and the interference signal components of the present user is transferred to a different transmission line and then subtracted, thereby reducing the transmission speed. However, it is very difficult to achieve simplification in construction by using the technique of this publication because it uses the parallel bus line.

In general, the DS-CDMA communication system, the chip rate, that is, the frequency of spread spectrum is high, and the multiplexing number of users can be increased as the frequency is spread to a broader band, thereby enabling high-speed data communications. Therefore, a communication system having a high chip rate has been recently required to be developed.

In the conventional type multi-user interference canceller, generation of interference replica signal, subtraction of the reception signal thereof, etc. are performed every spectrum-spread chip rate. That is, the reception signal is temporarily subjected to despreading to perform an transmission path estimation therefor and then reproduce interference components, and then the spreading is performed again because the interference components thus reproduced are subtracted from the reception signal (which is the chip rate and a multiplexed signal of all the user components).

Therefore, as the chip rate is higher, the interference canceller is required to perform the interference replica signal generation processing at a higher speed, and also the signal transmission amount between user cards is increased more and more.

Further, since the conventional system performs the processing on a chip-rate basis, band restriction is imposed on the reception signal to be processed by a transmission/reception band filter. Therefore, it is also necessary to impose the same band restriction on the interference replica signal thus generated, and thus a high-speed band restriction filter is needed, so that the device itself must be designed in a large scale.

Still further, a delay memory for holding the interference replica signal of the present user while it is left as the chip rate, and a delay memory for holding an interference replica signal of one stage of the present user of the previous stage are needed. In this case, the data to be held is the information on the chip rate, and thus a large capacity of memory is generally needed, and thus the enhancement in chip rate speed causes the increase of the capacity of the memory.

SUMMARY OF THE INVENTION

An object of the present invention is to simplify the construction of a DS-CDMA multi-user interference canceller, and provide the construction which can cancel the interference of the other users. Further, another object of the present invention is to avoid complication in device construction and increase in device scale due to interference generation and interference cancel at conventional chip rate with respect to the constructing method of a DS-CDMA multi-user interference canceller.

In order to attain the above objects, the present invention is characterized in that the signal of each user is first subjected to despreading in a correlator to be converted to a symbol rate signal, and then all of the processing of generating interference replica signal, the processing of subtracting the interference replica signal from the reception signal, etc. are performed on a symbol rate basis.

Specifically, according to an aspect of the present invention, a DS-CDMA (Direct Sequence—Code Division Multiple Access) multi-user interference canceller, is characterized by comprising: notifying means for notifying symbol information, a path-based delay and path-based transmission path estimation value information to other users; correlation value calculating means for beforehand calculating cross correlation values with spread code sequences of the other users in each user; interference calculating means for calculating interference components of the other users on the basis of the information notified from the other users and the cross correlation values which are calculated in advance; and means of subtracting the interference components from the signal component of the present user, thereby performing the interference component generation and cancellation at a symbol rate after the despreading of the reception signal is carried out.

Further, according to another aspect of the present invention, a DS-CDMA multi-user interference canceller for receiving spread signals from plural users and canceling the interference components between the respective data of the spread signals thus received to decode the data transmitted, is characterized by comprising: each correlator for receiving the spread signals from many users and subjecting each spread signal to despreading with a spread code sequence for each user to obtain a correlation value; interference cancellers of plural stages for subtracting the other interference replica from the correlation value of the correlator every user and performing RAKE combining; and a decode of each user for decoding the data from the RAKE-composed signal of the last stage of said interference canceller.

Figure 1:
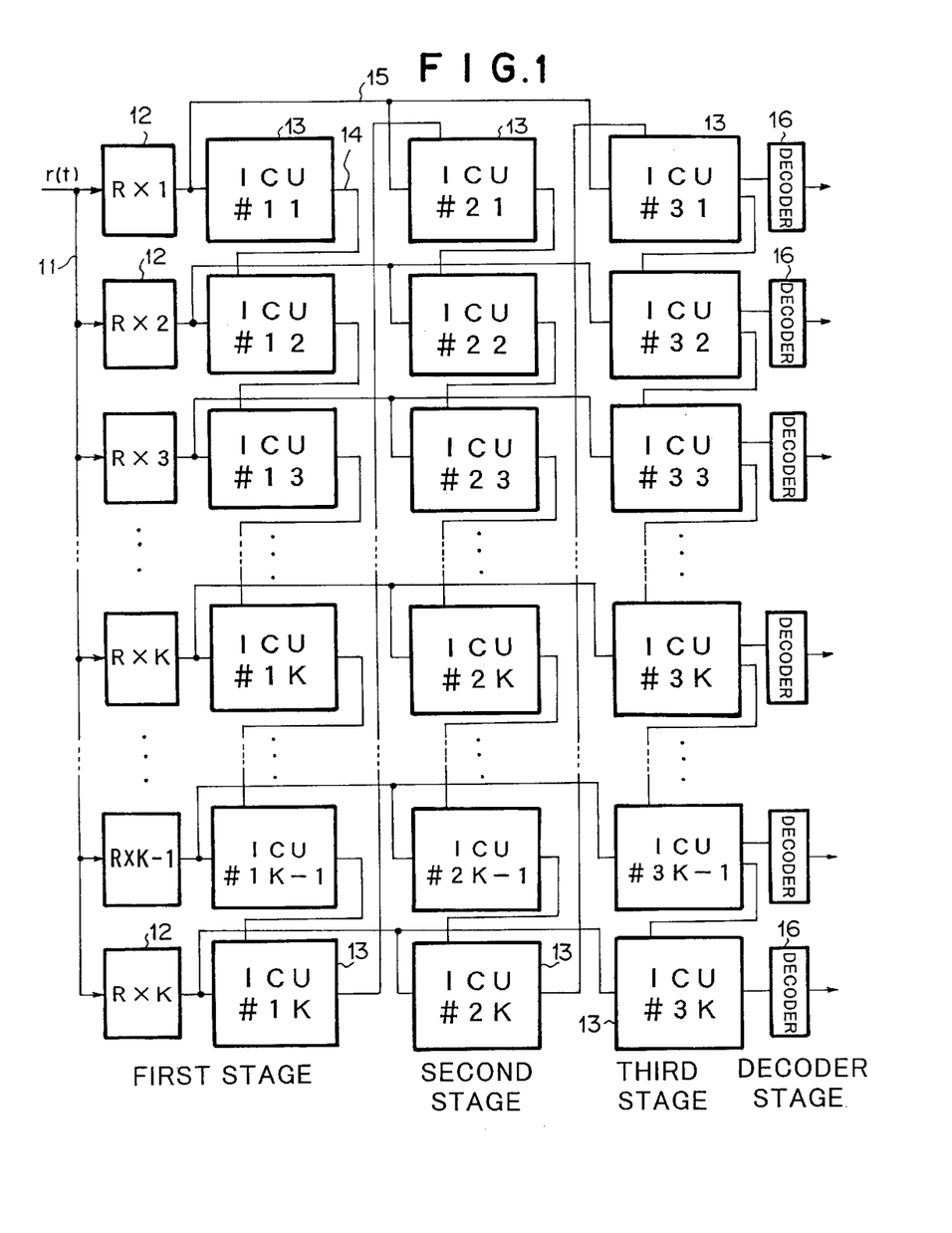
FIG. 1 is a block diagram showing the construction of a multi-user interference canceller according to the present invention.
Figure 2:
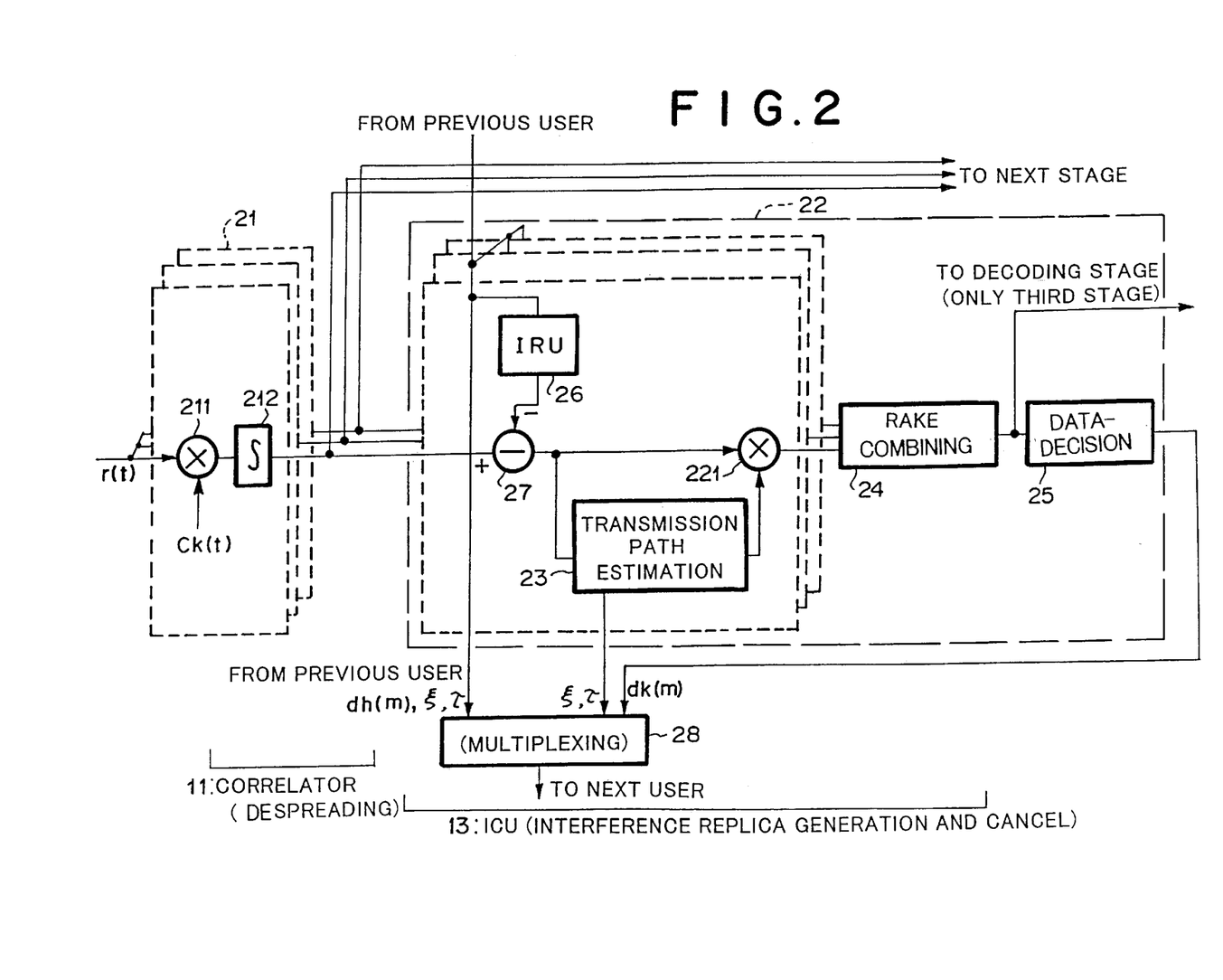
FIG. 2 is a block diagram showing the construction of an ICU (Interference Cancel Unit) according to the present invention.

Describing the present invention in more detail, FIG. 1 shows the overall construction of the present invention, and FIG. 2 shows the internal construction of ICU having the feature of the present invention. The present invention is characterized in that IRU (Interference Regeneration Unit) for generating an interference component imposed on the other users by the reception data of a user which is converted to a symbol rate in a correlator, and a subtracter for subtracting the interference component from the reception data of the symbol rate are provided, and the interference components of the other users are removed by directly using the symbol data.

Further, the correlator is mounted in only the first stage, and the output thereof is input (every path) to ICU of each stage.

The interference regeneration unit IRU executes the operation of beforehand calculating the cross correlation of the spread codes between the respective users on the basis of the spread code sequence of each user and the delay of each path which are held in advance, thereby calculating the interference component of each path of each user.

Accordingly, according to this system, the re-spreading when the interference replica is generated is not required, and the signal transmission between cards may be performed at a relatively low speed. Further, the band limiting filter after the re-spreading is not required, and thus the enlargement of the device scale can be prevented.

DETAILED DESCRIPTION OF THE PREFERRED EMBODIMENTS

Preferred embodiments according to the present invention will be described.

First Embodiment

In order to clarify the above and other objects, the features and the advantages of the present invention, a first embodiment according to the present invention will be described in detail with reference to the accompanying drawings.

FIG. 1 shows the overall construction of an interference canceller according to the first embodiment of the present invention.

In FIG. 1, reference numeral 11 represents a reception signal r(t). In a base station of a DS-CDMA communication system comprising base stations and portable mobile devices, each of DS-CDMA-based spread reception signals of plural users which are received by a reception antenna is amplified by a broad-band high-frequency signal amplifier while being subjected to band restriction and then converted to an intermediate frequency signal in a mixer. The intermediate frequency signal is multiplied by a second local oscillation signal or a carrier spread code to be converted to a base band signal, and the base band signal thus obtained is set as a reception signal. Reference numeral 12 represents correlators RX1, RX2, . . . and the reception signal r(t) is multiplied by a predetermined spread code to be subjected to the despread. Reference numeral 13 represents interference cancel units (ICU)#11, #12, . . . for generating interference replica to cancel interference, reference numeral 14 represents an interference replica signal and reference numeral represents a reception signal line of de-spread correlated signals. Reference numeral 16 represents decoders each of which is provided to each user and performs a decoding operation on the basis of the RAKE combining result of each path of each user which is carried out by each of ICU#31, #32, receiving the outputs of the correlators 12.

Next, the operation of the multi-user interference canceller of the base station will be described.

The reception signal r(t) 11 of the chip rate (all the users are multiplexed) is despreaded by the correlator (#11) 12, and separated into the signal of a specific path of a specific user to be converted to a symbol-based signal having the data sequence of a specific user and a path (transmission path) characteristic.

This signal (data) is supplied to the first ICU (Interference Cancel Unit) (#11) 13 through the reception signal line 15.

FIG. 2 shows the internal construction of ICU 13. In FIG. 2, a correlator 21 is disposed in only a first stage, and the output thereof is commonly used in a second and succeeding stages. The correlator 21 and ICU 22 are paired with each other, a necessary number of paths are arranged in parallel. The reception signal r(t) 11 is multiplied by an individual code of each user (and path delay) Ck(t) by a multiplier 211 in the correlator 21 corresponding to plural paths, and then integrated in an integrator 212, thereby performing the despreading operation every path.

Subsequently, the output of the correlator 11 is transmitted through the reception signal line to ICU(#11) 22 every path as described above. In ICU(#11) 12, a fading vector estimation value $\xi$ of the transmission path (and the delay $\tau$ every path) is generated by the transmission path estimator 23. Thereafter, it is multiplied by the inverse $\xi'$ of the generated fading vector $\xi$ to perform the phase/delay correction. Thereafter, each path of the same user is subjected to RAKE combining by the RAKE combiner 24, and the output of the RAKE combiner 24 is decided by the data-decision unit 25 to be decode the symbol data sequence.

The information on the first user thus generated (the symbol data sequence dk(m), the transmission path fading vector $\xi k,1$ of the path and the delay amount $\tau k,1$ of each path) is multiplexed in a multiplexing circuit and then transmitted to ICU(#12) 13 of a next second user.

ICU (#12) 13 of the second user is provided with an interference regeneration portion IRU (Interference Regenerate Unit) 26) according to this embodiment. The IRU 26 generates an interference component of the previous user to the present user on the parameter information (dk(m), $\xi k,1$, $\tau k,1$) from the previous user, the spread sequence of the previous user and the spread sequence of the present user. Thereafter, in the subtracter 27, the interference component of the symbol level generated by IRU 26 is subtracted from the correlation signal of the correlator 21.

The information of the user 2 is further obtained on the basis of the subtraction result, and thus the result is transferred to the next user to repeat the same processing. Multiplexing 28 functions to collectively multiplex the parameter information from the previous user and the parameter extracted from the user, and transmit the multiplexing result to the next user. The RAKE combiner 24, etc.

of FIG. 2 are well known, and they are not directly relevant to the present invention. Therefore, the detailed description of these units is omitted.

The operating principle of the interference canceller of this embodiment will be described hereunder.

If the number of all users in an area cell of the DS-CDMA communication system is represented by K, a user number is represented by k (1, 2, 3, . . . , k, . . . K), the reception signal of the user k is assumed to be separated into a path Lk and the delay time of each path is represented by τk1, the reception signal r(t) at the time t is represented as follows:

$$r(t) = \sum_{k=1}^{K} \sum_{L_K=1}^{L_K} \{c_k(t - \tau_{k,l}) d_{k,l}(t - \tau_{k,l}) \xi_{k,l}(t)\} + n(t) \tag{2}$$

Here, ck(t) represents the spread code sequence of the user k, dk(t) represents the symbol data sequence of the user k, ξk,1(t) represents the transmission path fading vector of 1-path of the user k, and n(t) represents a noise.

The reception signal r(t) is multiplied by the spread code sequence ck corresponding to each user which is added with the delay τk,1 corresponding to each path in the multiplier 211, and then integrated for a symbol period time T (correlation) in the integrator 212. The output yk,1(m) of the correlator which is the output of the integrator 212 at the timing of the m-th symbol is represented as follows:

$$y_{k,l}(m) = \int_{mT+\tau_{k,l}}^{(m+1)T+\tau_{k,l}} r(t) c_k^*(t - \tau_{k,l}) dt \tag{3}$$

Here, $c_k^*$ represents the complex conjugate of $c_k$.
By substituting the equation (2) into the equation (3), the following equation is obtained:

$$y_{k,l}(m) = \int_{mT+\tau_{k,l}}^{(m+1)T+\tau_{k,l}} c_k(t-\tau_{k,l}) c_k^*(t-\tau_{k,l}) d_k(t-\tau_{k,l}) \xi_{k,l}(t) dt + \tag{4}$$

$$\sum_{i=1,i\neq k}^{K} \sum_{k=1}^{Li} \int c_i(t-\tau_{i,j}) c_k^*(t-\tau_{k,l}) d_j(t-\tau_{k,l}) \xi_{i,j}(t) dt +$$

$$\sum_{j=1,j\neq l}^{L_k} \int c_k(t-\tau_{k,l}) c_k^*(t-\tau_{k,l}) d_k(t-\tau_{k,l}) \xi_{k,l}(t) dt +$$

$$\int n(t) c_k^*(t-\tau_{k,l}) dt$$

Here, the integration range is the same. In the equation (4), the first term represents the present path of the present user, that is, the desired wave, the second term represents interference from other users, the third term represents interference from another path of the present user and the fourth term represents a noise component.

The purpose of the interference canceller is to remove the interference components of the second and third terms of the equation (4).

The interference canceller of this embodiment will be described on the basis of the above general principle with reference to FIGS. 1 and 2.

In the first user of the first stage, only parameters needed to generate interference components which will be cancelled at a succeeding stage are generated because any interference to be subtracted has not yet been generated in the interference cancel unit (ICU #1,1). Accordingly, the interference regeneration unit IRU 26 is not used. Here, if the correlation is taken on the basis of the corresponding code sequence and delay by the correlator 11 of the path 1 of the user 1, the output of the correlator is represented as follows:

$$y_{1,l}(m) = \int_{mT+\tau_{k,l}}^{(m+1)T+\tau_{k,l}} c_j^*(t-\tau_{1,1}) c_j(t-\tau_{1,l}) d_j(t-\tau_{1,l}) \xi_{1,1}(t) dt = d_{j,(m)} \xi_{1,l}(m) \tag{5}$$

In the equation (5), the interference term and the noise term are neglected for convenience of description.

On the basis of this signal, ξ1,1(m) is estimated by the transmission path estimator 23, and multiplied by the inverse thereof ξ*$1,1$ to obtain a symbol data sequence dk(m) which is the corrected transmission fading vector ξ1,1.

In the RAKE combiner 24, the symbol data sequence dk(m) and the data d1 of another path of the user 1 are subjected to the RAKE combining, and then decided in the data-decision unit 25 to obtain the symbol data sequence d1(m) of the user 1. At this time point, the following three kinds of parameters are obtained:

Data sequence of user 1: d1(m)

Transmission fading vector of each path of user 1: ξ1,1 ξ1,2 ξ1,3

Delay of each path of user 1: τ1,1 τ1,2 τ1,3

These parameters are transmitted to ICU#12 of the next user 2, and the interference component of the user 1 to the path 1 of the user 2 is calculated on the basis of the second term of the equation (4) by IRU 26 as follows:

$$I_{2,1}(m) = \int_{mT+\tau_{2,1}}^{(m+1)T+\tau_{2,1}} c_2^*(t-\tau_{2,1}) c_1(t-\tau_{1,1}) d_1(t-\tau_{1,1}) \xi_{1,1}(t) dt + \tag{6}$$

$$\int_{mT+\tau_{2,1}}^{(m+1)T+\tau_{2,1}} c_2^*(t-\tau_{2,1}) c_1(t-\tau_{1,2}) d_1(t-\tau_{1,2}) \xi_{1,2}(t) dt +$$

$$\int_{mT+\tau_{2,1}}^{(m+1)T+\tau_{2,1}} c_2^*(t-\tau_{2,1}) c_1(t-\tau_{1,3}) d_1(t-\tau_{1,3}) \xi_{1,3}(t) dt$$

The interference component represented by the above equation is output from IRU 26 of the path 1 of the user 2, and subtracted (cancelled) in the subtracter 27.

The same calculation is carried out on the paths 2, 3 of the user 2 in ICU#2,2 and #2,3, and then subtracted.

$$I_{3,1}(m) = \int_{mT+\tau_{2,2}}^{(m+1)T+\tau_{2,2}} c_2^*(t-\tau_{2,2}) c_1(t-\tau_{1,1}) d_1(t-\tau_{1,1}) \xi_{1,1}(t) dt + \tag{7}$$

$$\int_{mT+\tau_{2,1}}^{(m+1)T+\tau_{2,1}} c_2^*(t-\tau_{2,2}) c_1(t-\tau_{1,2}) d_1(t-\tau_{1,2}) \xi_{1,2}(t) dt +$$

$$\int_{mT+\tau_{2,1}}^{(m+1)T+\tau_{2,1}} c_2^*(t-\tau_{2,2}) c_1(t-\tau_{1,3}) d_1(t-\tau_{1,3}) \xi_{1,3}(t) dt$$

$$I_{2,3}(m) = \int_{mT+\tau_{2,3}}^{(m+1)T+\tau_{2,3}} c_2^*(t-\tau_3) c_1(t-\tau_{1,1}) d_1(t-\tau_{1,1}) \xi_{1,1}(t) dt + \tag{8}$$

$$\int_{mT+\tau_{2,1}}^{(m+1)T+\tau_3} c_2^*(t-\tau_{2,3}) c_1(t-\tau_{1,2}) d_1(t-\tau_{1,2}) \xi_{1,2}(t) dt +$$

$$\int_{mT+\tau_{2,3}}^{(m+1)T+\tau_{2,3}} c_2^*(t-\tau_3) c_1(t-\tau_{1,3}) d_1(t-\tau_{1,3}) \xi_{1,3}(t) dt$$

The operation after the RAKE combining is the same as the operation for the user. In this case, the following parameters are obtained.

Data sequence of user 2: d2(m)

Transmission fading vector of each path of user 2: ξ2,1 ξ2,2 ξ2,3

Delay of each path of user 2: τ2,1 τ2,2 τ2,3

These parameters are transmitted to the user at the succeeding stage together with the parameters obtained in the user 1.

As described above, the interference replica signals of the users are successively generated and subtracted in the first stage. Therefore, as a user is located at a more succeeding (subsequent) position, a larger amount of previous interference is subtracted therefrom.

Next, the operation of the second stage will be described.

Since the parameters of all the paths (in this case, three paths) of all K users have been already obtained in the first stage, all the interference components other than that of the present path of the present user, that is, all the interference components of the other users and the interface components of the other paths of the present user are calculated in ICU#2,1. That is, the following $I_{1,l}(m)$ is calculated according to the equation (9), and it is output from IRU and the interference thereof is cancelled in the subtracter 27.

$$I_{1,l}(m) = \int_{mT+\tau_{l,1}}^{(m+1)T+\tau_{l,1}} c_1^*(t-\tau_{l,1})c_1(t-\tau_{1,2})d_1(t-\tau_{1,2})\xi_{1,2}(t)dt +$$

$$\int_{mT+\tau_{l,1}}^{(m+1)T+\tau_{l,1}} c_1^*(t-\tau_{l,1})c_1(t-\tau_{1,3})d_1(t-\tau_{1,3})\xi_{1,3}(t)dt +$$

$$\int_{mT+\tau_{l,1}}^{(m+1)T+\tau_{l,1}} c_1^*(t-\tau_{l,1})c_1(t-\tau_{2,1})d_1(t-\tau_{2,1})\xi_{2,1}(t)dt +$$

$$\int_{mT+\tau_{l,1}}^{(m+1)T+\tau_{l,1}} c_1^*(t-\tau_{l,1})c_1(t-\tau_{2,2})d_1(t-\tau_{2,2})\xi_{2,2}(t)dt +$$

$$\int_{mT+\tau_{l,1}}^{(m+1)T+\tau_{l,1}} c_1^*(t-\tau_{l,1})c_1(t-\tau_{2,3})d_1(t-\tau_{2,3})\xi_{2,3}(t)dt \ldots +$$

$$\int_{mT+\tau_{l,1}}^{(m+1)T+\tau_{l,1}} c_1^*(t-\tau_{l,1})c_1(t-\tau_{k,1})d_1(t-\tau_{k,1})\xi_{k,1}(t)dt +$$

$$\int_{mT+\tau_{l,1}}^{(m+1)T+\tau_{l,1}} c_1^*(t-\tau_{l,1})c_1(t-\tau_{k,2})d_1(t-\tau_{k,2})\xi_{k,2}(t)dt +$$

$$\int_{mT+\tau_{l,1}}^{(m+1)T+\tau_{l,1}} c_1^*(t-\tau_{l,1})c_1(t-\tau_{k,3})d_1(t-\tau_{k,3})\xi_{k,3}(t)dt \ldots +$$

$$\int_{mT+\tau_{l,1}}^{(m+1)T+\tau_{l,1}} c_1^*(t-\tau_{l,1})c_1(t-\tau_{K,1})d_1(t-\tau_{K,1})\xi_{K,1}(t)dt +$$

$$\int_{mT+\tau_{l,1}}^{(m+1)T+\tau_{l,1}} c_1^*(t-\tau_{l,1})c_1(t-\tau_{K,2})d_1(t-\tau_{K,2})\xi_{Kk,2}(t)dt +$$

$$\int_{mT+\tau_{l,1}}^{(m+1)T+\tau_{l,1}} c_1^*(t-\tau_{l,1})c_1(t-\tau_{K,3})d_1(t-\tau_{K,3})\xi_{K,3}(t)dt$$

As described above, the operation of "generation of interference components of the other users", "cancel of interference components of the other users" is repeated three times (multi-stage), and then the final decoding is carried out in the decoder.

As described above, the data transmitted between cards (the following data) are parameters which are irrelevant to the chip rate of the spread spectrum, and thus the device construction suffers no effect even when the chip rate is increased.

Data sequence of user k: dk(m)

Figure 3:
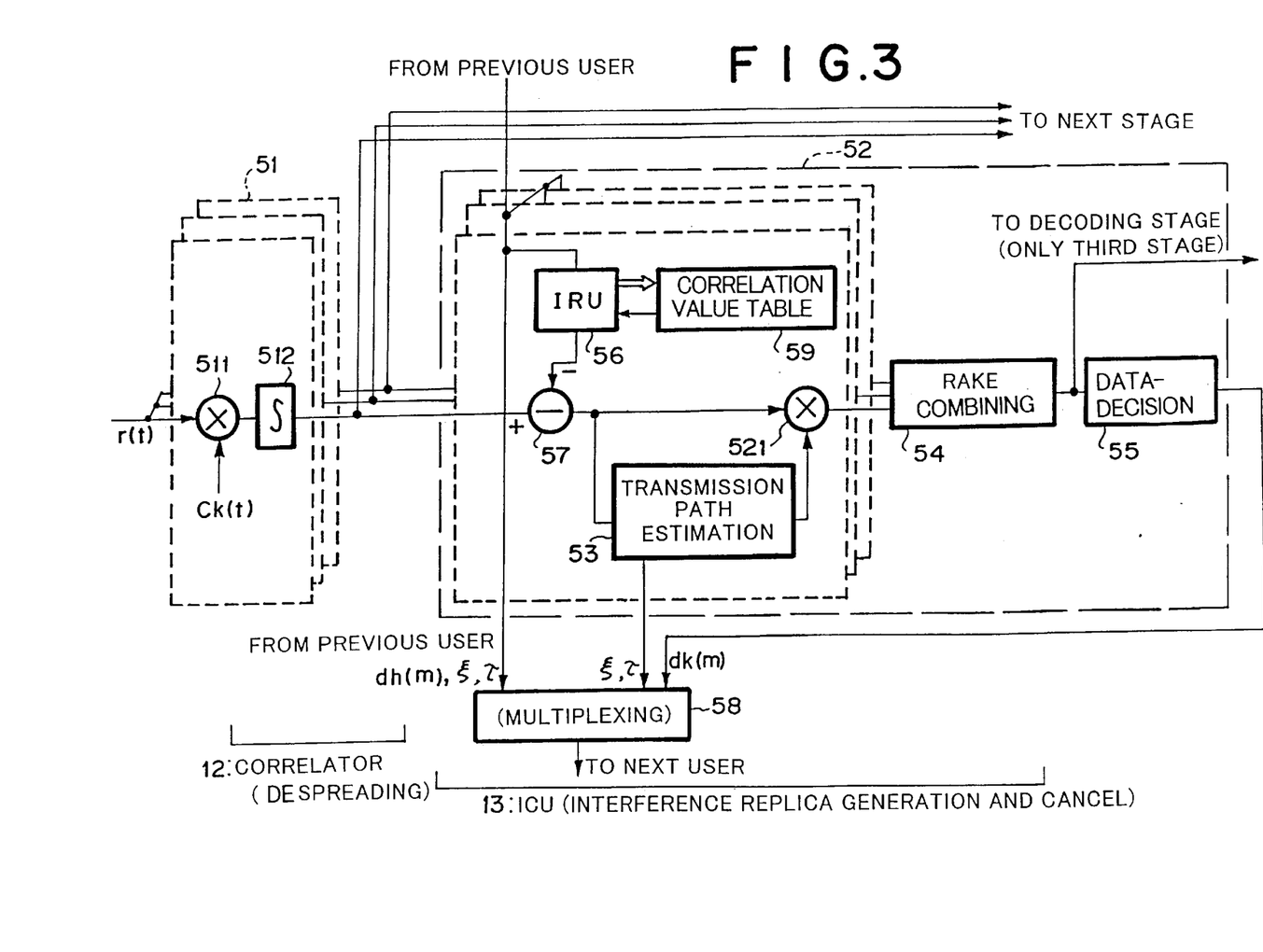
FIG. 3 is a block diagram showing the construction of the ICU (Interference cancel Unit) according to the present invention.

Transmission fading vector of each path of user k: $\xi k,1$ $\xi k,2$ $\xi k,3$ Delay of each path of user k: $\tau k,1$ $\tau k,2$ $\tau k,3$ In ICU#31, as in the case of ICU#11, #21, upon receiving the output of an integrator 512 of the correlator 12, the interference component of the symbol level generated in IRU 56 is subtracted from the interference replica obtained on the basis of the multiplexing information of ICU#2 at the last stage in a subtracter 57, and multiplied by the transmission fading vector of each path obtained in the transmission estimator 53. The outputs of the multipliers 52 of the respective paths are subjected to the RAKE combining, and the data transmitted are decoded in the decoder 16. As described above, even when interference waves of many users are intermixed with one another in the same area cell, the interference waves can be cancelled with a simple construction in the same and also accurate data having no interference wave can be decoded.

Further, according to this embodiment, the re-spreading function of interference replica, the function of the band limiting filter and the correlators in the second and succeeding stages which have been required in the conventional system are not required, and thus the implementation of the device can be facilitated and the cost can be reduced.

Second Embodiment

The basic construction of the second embodiment is the same as the first embodiment, however, the second embodiment is further improved in the method of calculating the cross correlation between the present user and the other users (or the other paths of the present user). FIG. 3 shows the internal construction of the improved part. In FIG. 3, a correlator 51 is mounted in the first stage, and the output thereof is commonly used in the second or succeeding stages. The correlator 51 and ICU 52 are paired, and correlators 51 and ICUs 52 whose pair number corresponds to a desired number of paths are arranged in parallel. The reception signal r(t) 11 is multiplied by the individual code (and path delay) Ck(t) of each user by a multiplier 511 in the correlator 51 corresponding to plural paths, and integrated in an integrator 512, thereby performing the despreading every path.

Subsequently, the output of the correlator 51 through the reception signal line 15 is transmitted to ICU(#11) 52 every path as described above. In ICU(#11) 52, the transmission fading vector estimation value $\xi$ (and the delay $\tau$ of each path) is generated by the transmission estimator 53. Thereafter, it is multiplied by the inverse $\xi^*$ of the fading vector $\xi$ thus generated to perform phase, delay correction. Thereafter, the respective paths of the same user are subjected to the RAKE combining by the RAKE combiner 54, and then the data-decision is made by the data-decision unit 55, whereby the symbol data sequence is decoded.

The information on the first user thus generated (symbol data sequence dk(m), the transmission fading vector $\xi k,1$ of paths and the delay amount $\tau k,1$ of each path) is multiplexed in the multiplexing circuit 58, and transmitted to ICU(#12) of the next second user.

The ICU(#12) of the second user is provided with an interference regeneration unit IRU 56 according to this embodiment. IRU 56 generates an interference component of the previous user to the present user from the parameter information (dk(m), $\xi k,1$, $\tau k,1$) from the previous user and the spread sequences of the previous user and the present user on the basis of a correlation value table of a correlation value MEMORY 59.

Thereafter, the interference component of the symbol level which is generated by IRU 56 is subtracted from the correlation signal of the correlator 51 in the subtracter 57.

The information of the second user 2 is further obtained on the basis of the subtraction result, and it is transmitted to the next user to repeat the same processing. The multiplexer 58 functions to collectively multiplex the parameter information from the previous user and the parameters extracted in the present user and transmit the multiplexing result to the next user. In FIG. 3, a searching operation of the correlation memory table 59 is carried out in place of the direct calculation of the cross correlation in IRU 56. The meaning thereof will be described.

In the foregoing description, c1*(t−τ1,1)ck(t31 τk,1)(k≠1, l≠1) calculates the cross correlation between the path 1 of the user 1 and the other users (or the other paths of the present user) in the following equation of the equation (8):

$$I_{1,l}(m) = \int_{mT+\tau_{l,1}}^{(m+1)T+\tau_{l,1}} c_1^*(t-\tau_{l,1})c_1(t-\tau_{1,2})d_1(t-\tau_{1,2})\xi_{1,2}(t)dt +$$

$$\int_{mT+\tau_{1,l}}^{(m+1)T+\tau_{l,1}} c_1^*(t-\tau_{l,1})c_1(t-\tau_{1,3})d_1(t-\tau_{1,3})\xi_{1,3}(t)dt + \ldots$$

In order to calculate the cross correlation, the actual values of both the spread code sequences must be known. The spread code sequence comprises two overlapped kinds of codes, a short code in which the sequence is repeated every symbol, and a long code having a period which is equal to or longer than the symbol length. In order to make the signals of the other users random, an extremely long sequence ($2 \times 10^{16}$ or the like) is generally used as the long code.

Therefore, it is necessary to determine both the actually-used sequences through the calculation before the cross correlation is calculated. However, the calculation may be difficult in view of the calculation time.

Therefore, as the long code is used a relatively short sequence which is longer than the symbol rate to the extent that the cross correlation with the other users can be kept to be small. For example when the long code is set to 128 chips 4-times over-sample, and the number of users is set to 16, the type of the cross correlation to be calculated in each card is:

128 (present sequence)×4 (oversample)×128 (other sequence)×4× 16 (of 16 users)=4,194,304 byte If there is a MEMORY of about 4 Mbytes, the cross correlation is immediately calculated by the table searching operation, that is, this contributes to reduction in processing load and processing time.

As described above, according to this embodiment, a long sequence which is necessary and sufficient, but not excessively long is used as a sequence called as a long code of a spread code sequence which is the essence of the spread spectrum system, whereby the construction of the multi-user interference canceller can be simplified and more easily implemented without inducing deterioration of characteristics.

As described above, according to the multi-user interference canceller of the present invention, the processing can be performed without re-spreading the interference replica thereof by directly using the symbol rate. Therefore, even when the chip rate is increased, the device scale is not required to be enlarged.

The present invention is not limited to the above embodiment, and various modifications may be properly made without departing from the subject matter of the present invention.

What is claimed is:

1. A DS-CDMA (Direct Sequence—Code Division Multiple Access) multi-user interference canceller, comprising:
   notifying means for notifying symbol information, a delay of each path and transmission estimation value information of each path to interference calculating means of the other users;
   correlation value calculating means for calculating cross correlation values with spread code sequences of a present user and spread code sequences of other users in advance;
   interference calculating means for calculating interference components of the other users on the basis of the symbol information, the delay of each path and the transmission estimation value information of each path notified by interference calculating means of the other users and the cross correlation values calculated in advance; and
   subtraction means for subtracting the interference components from a reception signal, whereby the interference components are generated and cancelled at a symbol rate after said reception signal is subjected to despread.

2. The DS-CDMA multi-user interference canceller as claimed in claim 1, wherein by setting a long code to have a proper length, the cross correlation value between a spread code sequence of the present user and a spread code of another user is calculated in advance, and the cross correlation value between the present user and another user is stored in MEMORY.

3. The DS-CDMA multi-user interference canceller as claimed in claim 1, wherein said noticing means receives interference replica of a previous another user to calculate the difference between its own correlation value and the interference replica of a previous user and multiplying the difference by the inverse of a transmission path fading vector estimation value ξ in a transmission path estimator, the multiplication results of respective paths are subjected to RAKE combining to obtain a symbol data sequence, and the symbol data sequence, the delay time of each path and the fading vector estimation value ξ are notified to inference calculating means of the next another user.

4. The DS-CDMA multi-user interference canceller as claimed in claim 1, wherein said interference calculation means comprises an interference regeneration unit (IRU) for calculating the interference components of the other users on the basis of the interference replica notified from interference calculating means of the previous another user and the pre-calculated cross correlation values.

5. The DS-CDMA multi-user interference canceller as claimed in claim 1, wherein said subtraction means for subtracting the interference components from the signal component of the present user subtracts the interference replica of the other users from the signal outputting the correlation value by an despreading unit for despreading the reception signal and an integrator for integrating the de-spread signal, each of which is provided to the present user.

6. A DS-CDMA communication system comprising a mobile station or a base station using the DS-CDMA multi-user interference canceller as claimed in claim 1.

7. The DS-CDMA multi-user interference canceller as claimed in claim 2,
   wherein said notifying means receives interference replica of a previous another user to calculate the difference between its own correlation value and the interference replica of a previous user and multiplying the difference by the inverse of a transmission path fading vector estimation value ξ in a transmission path estimator, the multiplication results of respective paths are subjected to RAKE combining to obtain a symbol data sequence, and the symbol data sequence, the delay time of each path and the fading vector estimation value ξ are notified to interference calculating means of the next another user.

8. The DS-CDMA multi-user interference canceller as claimed in claim 2,
wherein said interference calculation means comprises an interference regeneration unit (IRU) for calculating the interference components of the other uses on the basis of the interference replica notified from interference calculating means of the previous another user and the pre-calculated cross correlation values.

9. The DS-CDMA multi-user interference canceller as claimed in claim 2, wherein said subtraction means for subtracting the interference components from the signal component of the present user subtracts the interference replica of the other users from the signal outputting the correlation value by an despreading unit for despreading the reception signal and an integrator for integrating the de-spread signal, each of which is provided to the present user.

10. A DS-CDMA communication system comprising using the a mobile station or a base station using the DS-CDMA multi-user interference canceller as claimed in claim 2.

11. The DS-CDMA multi-user interference canceller as claimed in claim 3, wherein said interference calculation means comprises an interference regeneration unit (IRU) for calculating the interference components of tie other users on the basis of the interference replica notified from interference calculating means of the previous another user and the pre-calculated cross correlation values.

12. The DS-CDMA multi-user interference canceller as claimed in claim 3, wherein said subtraction means for subtracting the interference components from the signal component of the present user subtracts the interference replica of the other users from the signal outputting the correlation value by an despreading unit for despreading the reception signal and an integrator for integrating the de-spread signal, each of which is provided to the present user.

13. A DS-CDMA communication system comprising a mobile station or a base station using the DS-CDMA multi-user interference canceller as claimed in claim 3.

14. The DS-CDMA multi-user interference canceller as claimed in claim 4, wherein said subtraction means for subtracting the interference components from the signal component of the present user subtracts the interference replica of the other users from the signal outputting the correlation value by an despreading unit for despreading the reception signal and an integrator for integrating the de-spread signal, each of which is provided to the present user.

15. A DS-CDMA communication system comprising a mobile station or a base station using the DS-CDMA multi-user interference canceller as claimed in claim 4.

16. A DS-CDMA communication system comprising a mobile station or a base station using the DS-CDMA multi-user interference canceller as claimed in claim 5.

17. A DS-CDMA multi-user interference canceller for receiving spread signals from plural users and canceling interference components between data of the signals to decode the transmitted data, the DS-CDMA multi-user interference canceller comprising:
a plurality of correlators provided only at a first stage, said correlators receiving the spread signals and despreading the spread signals with respective spread code sequences for respective multiple users to obtain correlation values;
interference cancellers at plural stages, said interference cancellers calculating a difference between the correlation values of said correlators and an interference replica of said respective multiple users at a symbol rate and outputting a RAKE-combined signal; and
a decoder for decoding the data from the RAKE-combined signal of a final stage of said interference canceller, whereby the interference components are generated and cancelled at a symbol rate after a reception signal is subjected to despread.

18. The DS-CDMA multi-user interference canceller as claimed in claim 17, wherein said interference canceller subtracts the interference replica of the other users from the correlation value of the present user, calculates the inverse of a fading vector estimation value ξ from its own signal thus subtracted by a transmission estimator, multiplies its own signal by the inverse of the fading vector estimation value ξ and performs the RAKE combining.

19. A DS-CDMA communication system comprising a mobile station or a base station using the DS-CDMA multi-user interference canceller as claimed in claim 17.

20. A DS-CDMA communication system comprising a mobile station or a base station using the DS-CDMA multi-user interference canceller as claimed in claim 18.

* * * * *